April 14, 1970  R. B. GRAHAM  3,505,892
LARGE DIAMETER SPROCKET WHEEL
Filed June 3, 1968
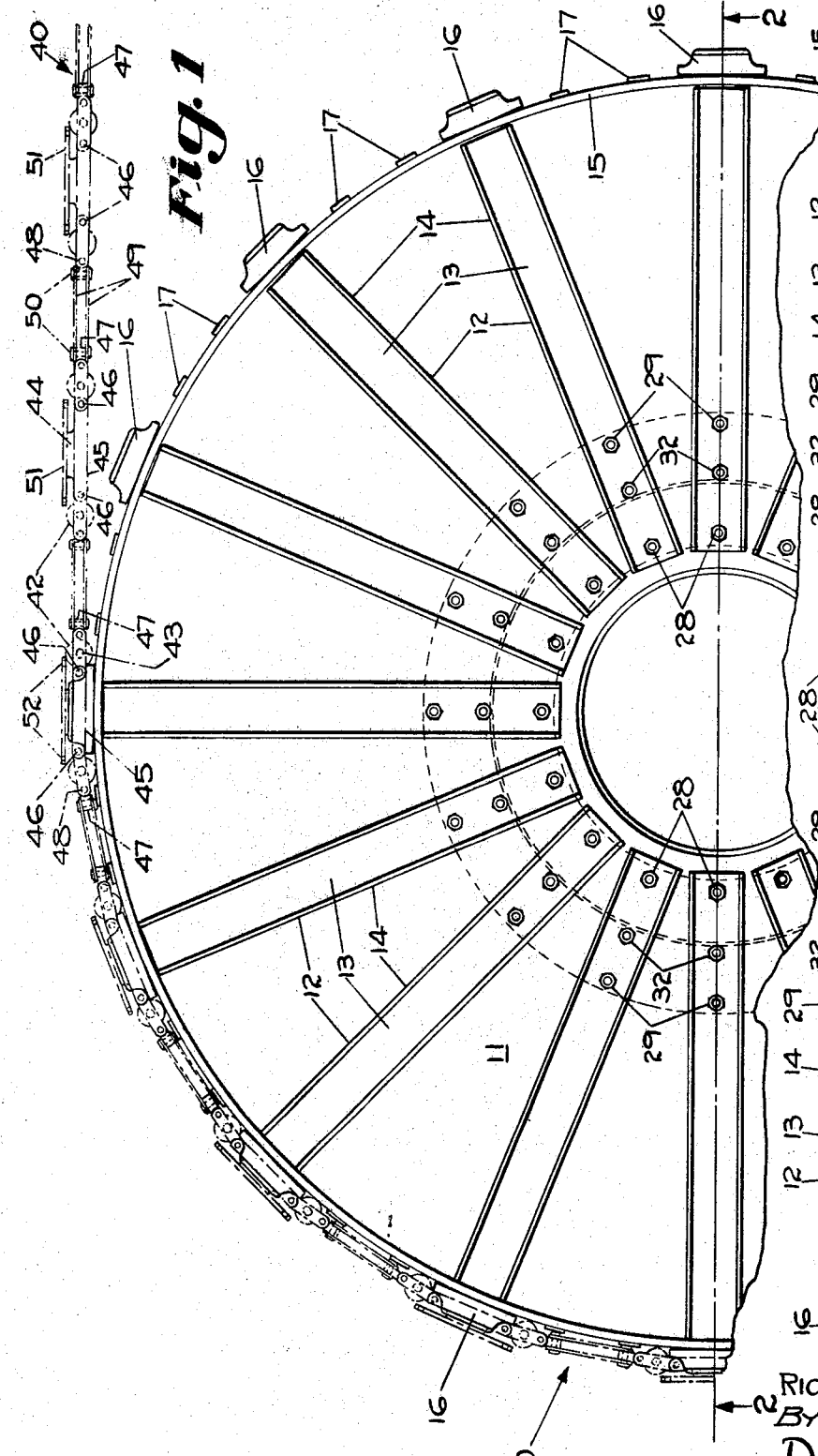
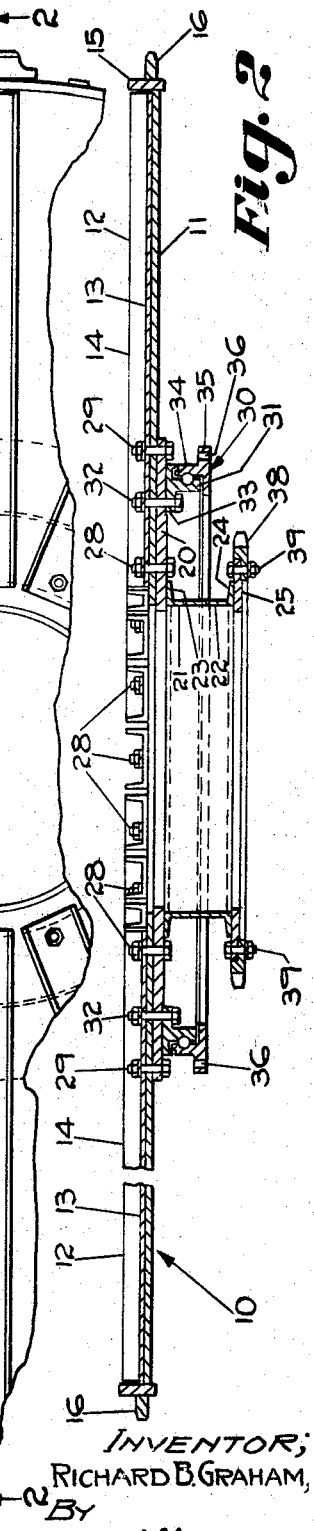
INVENTOR;
RICHARD B. GRAHAM,
BY
David Young
ATTORNEY.

United States Patent Office 3,505,892
Patented Apr. 14, 1970

3,505,892
LARGE DIAMETER SPROCKET WHEEL
Richard B. Graham, Columbus, Ohio, assignor to Jeffrey Galion Manufacturing Company, a corporation of Ohio
Filed June 3, 1968, Ser. No. 733,925
Int. Cl. F16h 55/30
U.S. Cl. 74—243
4 Claims

ABSTRACT OF THE DISCLOSURE

A large diameter sprocket wheel of simple construction, which is substantially rigid to support a chain on such sprocket wheel.

---

The instant invention relates to the construction of large diameter sprocket wheels.

In a carousel type sorting machine there is an endless chain which travels around the sorting room, usually at the perimeter of the room, and such chain is guided in a track to follow the predetermined path. Baskets or carriers for the parcels or articles that are to be sorted are attached to the chain at successive positions. The articles are placed on the carriers of the chain and then are selectively discharged at the proper positions along the travel of the chain, which accomplises the sorting function.

The chain of the carousel sorting machine is driven by a sprocket wheel which has a large diameter for a large radius turn of the chain. The configuration of the chain and the carriers on the chain are such that unless a large radius turn is provided the several parts will interfere.

In order to provide satisfactory service in the carousel type sorting machine the sprocket wheel is required to be of relatively light weight and extremely rigid, in order to properly support the chain in the turn around the sprocket wheel. If the sprocket wheel drives the chain, then it must also support the loads of the forces transmitted by the elements of the sprocket wheel, in order to move the chain and the articles carried by the chain.

It is an object of this invention to provide an improved construction of a large diameter sprocket wheel.

It is a further object to provide a large diameter sprocket wheel which is of relatively light weight for its size.

It is another object to provide an improved sprocket wheel of large diameter which is relatively rigid for its size.

It is also an object to provide an improved sprocket wheel of large diameter through which driving forces may be effectively transmitted in an efficient manner.

It is still another object to provide an improved sprocket wheel of large diameter, which may be constructed in a simple manner from commonly available materials.

Other objects of the invention will appear hereinafter, the novel features and combinations being set forth in the appended claims.

In the drawings:

FIG. 1 is a plan view of the large diameter sprocket wheel and a phantom illustration of a chain which may be driven by such sprocket wheel; and FIG. 2 is a sectional view on the line 2—2 in FIG. 1.

The large diameter sprocket wheel 10 has an upper plate that is the web 11 with a circular configuration that establishes the diameter of the wheel 10. The web 11 has a circular cutout in the middle which removes unnecessary material. On the upper surface of the web 11 there are a plurality of radial support members 12, 12 at circumferentially spaced positions. Each support member 12 may be formed of common channel stock, placed with its channel web 13 against the web 11 and with the channel legs 14, 14 in upstanding position.

Each radial support member 12 may be secured to the circular web 11 by welding, which effectively unites these elements in an assembly which is substantially more rigid than the circular web 11 alone, and supports the load of the driving forces in the carousel sorting machine.

At the periphery of the circular web 11 there is an upstanding sprocket ring 15 which may be formed of common bar stock that is rolled to meet the circumference of the periphery of the circular web 11. The sprocket ring 15 is placed in upstanding position at the periphery of the web 11 and is secured to the latter, as by welding. A plurality of sprocket teeth 16, 16 are cut to the desired configuration for the chain of the carousel sorting machine, and are secured to the sprocket ring 15 each in radial alignment with a support member 12. Each sprocket tooth 16 is secured to the sprocket ring 15, as by welding. Between the adjacent sprocket teeth 16, 16, blocks 17, 17 are secured to the ring 15, as by welding, and such blocks 17, 17 serve as bearing elements for the chain of the carousel sorting machine.

The several elements, including the circular web 11, the radial support members 12, 12, the sprocket ring 15, the sprocket teeth 16, 16, and the blocks 17, 17, when assembled and secured in assembly, as described above, together form a unitary wheel weldment of the sprocket wheel 10. The wheel weldment engages the chain of the carousel sorting machine, and either guides or drives the chain in a turn.

The driven part of the large diameter sprocket wheel 10 has a circular middle plate that is the base member 20 of the sprocket wheel 10. The center part of the base member 20 is cut out, since this material is not required. The base member 20 is placed below the circular web 11 and adjacent to the latter. A torque transmitting element 21 extends downwardly from the base member 20. The torque transmitting element 21 may be formed from common channel stock which is rolled to a circular configuration and is concentric with the base member 20. The element 21 is disposed with its channel web 22 in upright position, and the upper channel leg 23 adjacent the base member 20. The torque transmitting element 21 is secured to the base member 20, as by welding.

A bottom ring 25 is placed against the lower channel leg 24 and is secured to the latter, as by welding. The bottom ring 25 is formed from plate material which is cut to the circular configuration, and the center part is cut out, since this is not needed. The ring 25 is concentric with the base member 20.

The several elements, including the base member 20, the torque transmitting element 21, and the circular bottom ring 25, secured to each other as described above, form a unitary assembly for attachment to the assembly of the circular web 11. The assembly of the circular web 11 is secured to the assembly of the base member 20 by a circle of inner cap screws 28, 28 and by a circle of outer cap screws 29, 29. Each of the cap screws 28, 29 extends through the base member 20, the circular web 11, and a radial support member 12.

Below the base member 20 there is an annular bearing 30, of which the inner race 31 is secured to the base member 20 by a circle of cap screws 32 that are disposed between the inner circle of cap screws 28 and the outer circle of cap screws 29. Each cap screw 32 extends through the flange 33 of the bearing inner race 31, through the base member 20, through the circular web 11, and through a radial support member 12. The outer race 34 of the bearing 30 has a flange 35 with a plurality of holes 36 arranged in a circle to receive cap screws, by which the bearing may be secured to a foundation or a base on which the large diameter wheel 10 is supported. The bearing 30 permits free rotation of the sprocket wheel 10.

A ring sprocket 38 is secured to the bottom ring 25 by a plurality of cap screws 39, 39, which are arranged in a circle. The ring sprocket 38 is the driven element that may be driven by a power transmitting chain to rotate the sprocket wheel 10 on the bearing 30. The annular bearing 30 is disposed intermediate the circular web 11 and its sprocket teeth 16, 16 and the ring sprocket 38, which has the effect of acting to balance the forces on the assembly of the circular web 11 and on the assembly of the base member 20, in order to reduce or avoid bending or distortion in the sprocket wheel 10. The sprocket ring 38 is of relatively large diameter, and the plane of the ring sprocket 38 is relatively close to the plane of the sprocket teeth 16, 16, with the annular bearing 30 therebetween, which effectively reduces the radial length of the torque arm of the forces on the driven and driving parts of the sprocket wheel 10, and also acts to minimize or avoid bending or distortion of the sprocket wheel 10.

The assembly of the circular web 11 is releasably secured to the base member 20 by the several cap screws 28, 29, 32, and therefore, it may be removed for replacement or for substitution of another element which may be of different size or configuration. The ring sprocket 38 is also releasably secured to the bottom ring 25 by the several cap screws 39, and it also may be removed for replacement or substitution of a different ring sprocket.

In FIG. 1 there is illustrated in phantom lines a chain 40 which may be driven by the large diameter sprocket wheel 10. The chain 40 has links 41, in each of which there is a rotatably supported roller 42 on a pin 43. The rollers 42 guide the chain 40 in a track which defines the path of the chain 40 in the sorting room. There is another tracking link 44 which is similar to the tracking link 41, but is oppositely disposed. The tracking link 44 also has a roller 42 which is rotatably supported on a pin 43. Side bars 45, 45 are connected to the adjacent ends of the tracking links 41, 44 by pins 46, 46 which provide articulated connections. The sprocket teeth 16 engage the chain 40 between the side bars 45, 45 to drive the chain 40. Each of the tracking links 41, 44 has a universal element 47 on a transverse pin 48. Side bars 49, 49 are connected to each universal element 47 by a pin 50. The universal elements 47 permit movement of the chain in planes which are normal to each other.

Attachment wings 51 are formed integrally with one of the side bars 45 between the tracking links 41, 44. Each attachment wing 51 has a pair of holes 52, 52 by which a carrier for the articles may be attached to be carried by the chain through the path of the carousel sorting machine as defined by the track in the room. Each sprocket tooth 16 engages in the space between the side bars 45, 45 and thereby supports an attachment wing 51 and its carrier.

The large diameter sprocket wheel 10 may be of the order of ten feet in diameter. The sprocket wheel 10 that is constructed as described herein, is of relatively light weight for its size. This makes it feasible to use such sprocket wheel in a horizontal plane. The sprocket wheel 10 also is of such rigid construction, and the elements thereof are disposed relatively to each other in such manner as to minimize or avoid the effects of the forces on the sprocket wheel 10, such that the latter operates freely on the annular bearing 30 to effectively serve its intended function.

Having thus described and shown an embodiment of the invention, what it is desired to secure by Letters Patent of the United States is:

1. A large diameter sprocket wheel comprising a base member, a circular web laying on said base member and extending radially outwardly from said base member for a substantial distance to establish the diameter of the sprocket wheel, a plurality of radial supporting arms for said web disposed at circumferentially spaced positions around the web, each said radial supporting arm extending substantially to the circumference of said circular web, each said radial supporting arm including a flat part that is placed in surface to surface abutment with said web and a leg that is upstanding from the flat part, means to unite each of said radial supporting arms with the web in a structural assembly, means extending through said base member, through said circular web and through the flat part of each of at least several of said radial supporting arms to secure the circular web and its radial supporting arms to the base member, circumferentially spaced sprocket teeth at the circumference of said web, and bearing means on said base member to rotatably support the sprocket wheel.

2. A large diameter sprocket wheel as recited in claim 1 in which said base member is formed as a flat annular ring, said circular web is a flat plate member laying on the annular ring of said base member, each of said radial supporting arms is a structural channel element of which said flat part is the channel web laying on the flat plate member of said circular web, each channel element of said radial supoprting arms extending radially from over said annular ring of the base member to the circumference of said circular web, an upstanding ring secured to the circumference of said circular web, and said circumferentially spaced sprocket teeth being disposed on said upstanding ring and secured to the outer circumferential surface of the upstanding ring.

3. A large diameter sprocket wheel as recited in claim 2 in which said radial supporting arms are united with said circular web by welding the arms to the web, said upstanding ring is secured to said circular web by welding the upstanding ring to the circumference of the web, and said sprocket teeth are secured to said upstanding ring by welding the sprocket teeth to the upstanding ring.

4. A large diameter sprocket wheel as recited in claim 1 in which said bearing means comprises a ring bearing, means to secure said ring bearing to said base member in which the securing means extends through the base member, through said circular web and through each of at least several of said radial supporting arms, an annular torque transmitting member secured to said base member and extending from the base member in the axial direction to the opposite side of said ring bearing from the base member, a driving ring sprocket for rotatng the large diameter sprocket wheel, and means to secure said driving ring sprocket to said torque transmitting member at said opposite side of said ring bearing.

References Cited

UNITED STATES PATENTS

| | | | |
|---|---|---|---|
| 1,509,655 | 9/1924 | Kibele et al. | 74—230.9 |
| 3,350,950 | 11/1967 | Gandrud | 74—243 |

OTHER REFERENCES

"Product Engineering," April 1937, page 127.

JAMES A. WONG, Primary Examiner